United States Patent [19]
Talley

[11] 3,773,661
[45] Nov. 20, 1973

[54] VIBRATORY SEPARATOR FOR CONCENTRATING A SOLIDS CONTAINING LIQUID

[75] Inventor: Walter J. Talley, Brentwood Park, Calif.

[73] Assignee: Sweco, Inc., Los Angeles, Calif.

[22] Filed: July 23, 1971

[21] Appl. No.: 165,630

[52] U.S. Cl. ............ 210/19, 210/77, 210/388, 210/399
[51] Int. Cl. ............ B01d 29/04, B01d 29/28
[58] Field of Search ............ 210/19, 77, 79, 384, 210/388, 399, 445, 383

[56] References Cited
UNITED STATES PATENTS

| | | | |
|---|---|---|---|
| 3,630,377 | 12/1971 | Brooks | 210/19 |
| 3,570,670 | 3/1971 | Endo et al. | 210/388 |
| 3,463,727 | 8/1969 | Fahey | 210/19 |
| 2,932,552 | 4/1960 | Weiss et al. | 210/19 |
| 3,672,507 | 6/1972 | Paull, Jr. | 210/77 |
| 899,194 | 9/1908 | Tiemann | 210/388 |

*Primary Examiner*—Samih N. Zaharna
*Assistant Examiner*—F. F. Calvetti
*Attorney*—Lyon & Lyon

[57] ABSTRACT

There is disclosed herein a vibratory separator for concentrating a solids-containing liquid stream. The separator utilizes a lower chamber which is caused to vibrate by a source of vibratory energy. The stream to be concentrated is fed into the lower chamber which is closed at its bottom and covered at the top by a screen. A portion of the liquid passes upwardly through the screen and the solids which are too large to pass through the screen remain below in the lower chamber. A relatively solids-free stream is removed from above the screen and a concentrate stream is removed from the lower chamber.

9 Claims, 2 Drawing Figures

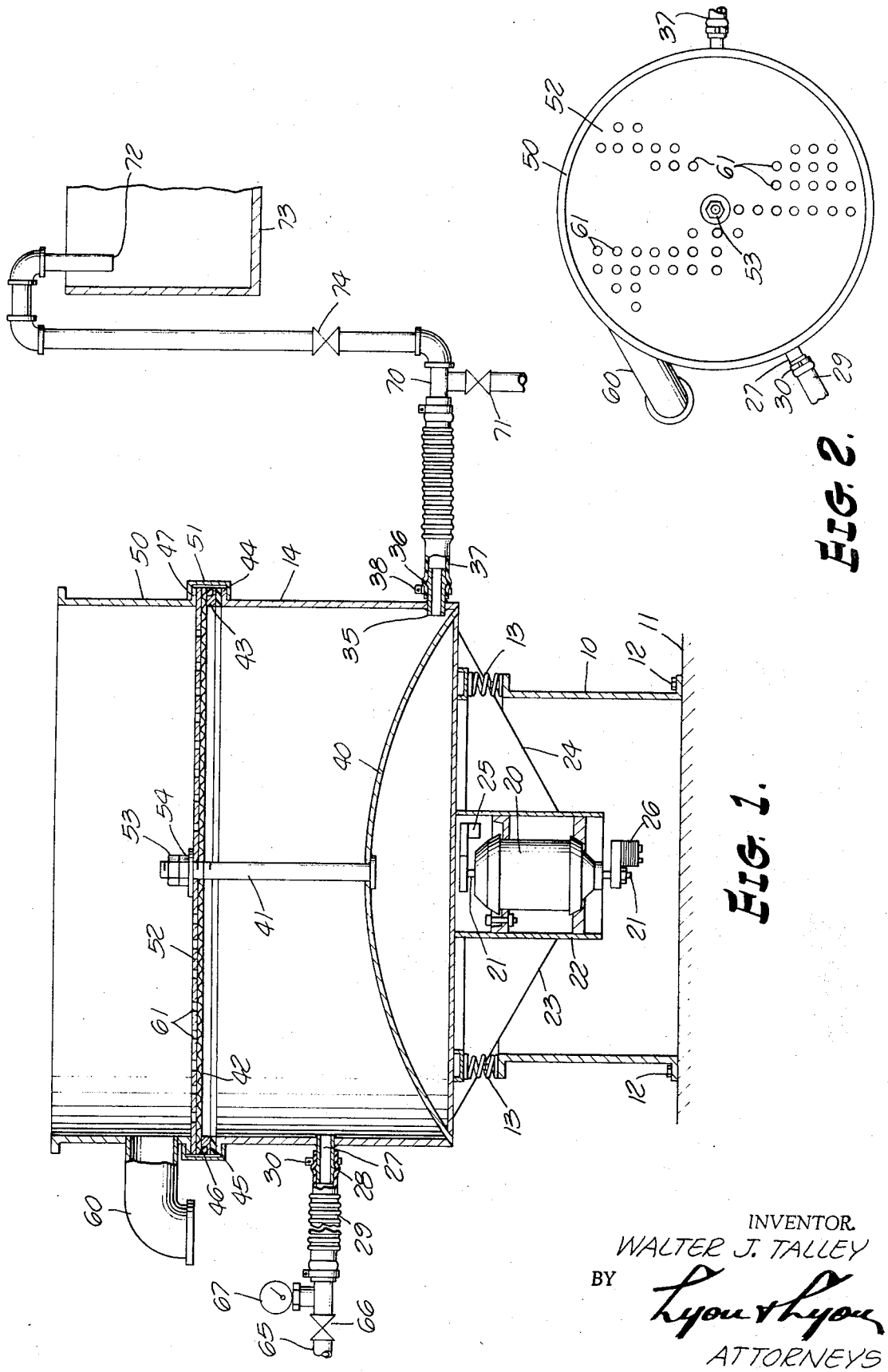

3,773,661

VIBRATORY SEPARATOR FOR CONCENTRATING A SOLIDS CONTAINING LIQUID

BACKGROUND OF THE INVENTION

The field of the invention is liquid-solid separators or concentrators which are capable of concentrating a solids-containing liquid stream. While separations of this type are normally carried out by either a settling basin or a filter, there are some operations where separations are so difficult that neither of these methods is satisfactory. One such operation is the concentration of activated sludge which will not readily settle and which quickly plugs most filters.

Activated sludge is composed of discrete particles called floc which are a gelatinous matrix in which microorganisms are embedded. These floc particles will not readily settle and have a tendency to plug a filter surface. As the water content of the floc particles decreases, the floc often tends to turn into a gelatinous mass which has no observable particle structure.

Various means are known to chemically condition a liquid, containing suspended floc particles to increase the tendency of the particles to separate from the liquid. One such method is the addition of a polyelectrolyte such as the cationic polymers sold under the tradename PURIFLOC 401 and 402 and the anionic polymers sold under the tradename PURIFLOC 501 and 502. Such polymers are often used at a concentration of 2 mg/l in combination with 50 mg/l of alum. Another method which is sometimes useful in the concentration of floc particles is acetone coascervation. This involves the addition of acetone for the purpose of dehydrating the adsorbed water layer surrounding the microorganisms in the floc. Acetone levels up to 50 percent are often necessary to give noticeably improved results. Even with chemical conditioning, the floc particles are difficult to separate from the liquid.

In addition to chemical conditioning of activated sludge, physical means such as centrifugation has also been used. Major problems associated with centrifugation include high initial equipment costs together with relatively high maintenance costs.

SUMMARY OF THE INVENTION

Accordingly, it is a primary object of the present invention to provide a novel separator which is capable of concentrating a solids-containing liquid stream.

It is another object of the present invention to provide a novel separator which can dewater waste activated sludge.

It is yet another object of the present invention to provide an improved vibratory separator which is adapted to produce a relatively solids-free stream from an influent containing floc particles.

Briefly, the present invention is directed to a vibratory separator having a lower, liquid-containing chamber which is caused to vibrate by a source of vibratory energy. A porous screen is maintained across the top of the lower chamber and the solids-containing influent is fed into the chamber under pressure. The liquid passes upwardly through the screen and is separated from those solid particles which are too large to pass through the screen and a relatively solids-free effluent is withdrawn from the upper surface of the screen. A portion of the solids-containing liquid in the lower chamber may be continuously withdrawn to form a concentrate stream.

The effectiveness of the present method is believed to be caused by the vibratory action of the top screen which appears to help prevent the build up of floc particles on the lower surface of the top screen. It is believed that the vibratory action tends to separate a portion of the floc particles from the screen and these separated particles tend to fall away from the upper screen by the force of gravity. It is further believed that some compaction and aggregation of the floc particles occurs at the lower screen surface and that this tends to improve the settling rate of these particles.

BRIEF DESCRIPTION OF THE DRAWING

FIG. 1 is a cross-sectional side elevation of the separator of the present invention.

FIG. 2 is a plan view of the separator of FIG. 1.

DESCRIPTION OF THE PREFERRED EMBODIMENTS

Turning now to FIG. 1, there is shown a vibratory separator which is maintained above a base 10 which may be bolted to a concrete footing 11 by a series of bolts 12. A plurality of coil springs 13 are affixed at their lower end to base 10 and at their upper end to lower chamber 14.

A motor 20 having a central shaft 21 is rigidly affixed to a cylinder 22 which in turn is rigidly held to lower chamber 14 by gusset plates such as those shown at 23 and 24. Upper eccentric weight 25 is affixed above the motor to shaft 21 and lower eccentric weight 26 is affixed below the motor on shaft 21. The angular position of lower weight 26 is adjustable with respect to upper weight 25. The angle between these two weights is referred to as the lead angle and the adjustment of this angle affects the nature of the motion which may be imparted to the upper chamber in a manner known to those skilled in the vibratory separator art. Likewise, the amount of weight which may be placed on shaft 21 is also variable.

An inlet nipple 27 is welded to the side of lower chamber 14. A raised ring 28 is located on the exterior of nipple 27 to help secure a flexible, reinforced rubber inlet hose 29 to the nipple. A clamp 30 is placed around the exterior of hose 29 to secure it to nipple 27.

An outlet nipple 35 is welded to lower chamber 14 near the bottom of chamber 14. Nipple 35 also has a raised ring 36 which helps secure a flexible, reinforced rubber outlet hose 37 to nipple 35. A clamp 38 further secures hose 37 to nipple 35. The location of nipple 35 near the bottom of lower chamber 14 facilitates the continuous removal of solid material which may settle to the bottom of chamber 14.

Lower chamber 14 has a domed shaped bottom 40 which further helps to direct settling solids to the outer circumferential wall of lower chamber 14. A center tiedown rod 41 is welded to the center of dome 40 and the upper portion of rod 41 is threaded.

A flange 44 is located along the top of lower chamber 14. A gasket 45 is placed on the upper surface of flange 44 and a tension ring 43 rests upon gasket 45. An O-ring 46 is then placed on top of tension ring 43. Flange 47 which is located along the bottom circumference of upper chamber 50 is next placed on O-ring 46. A clamp band 51 is then tightened around flange 47, O-ring 46, tension ring 43, gasket 45 and flange 44. This forms a water-tight and vibration resistant seal between upper chamber 50 and lower chamber 14 and also holds tension ring 43 which supports screen 42. A perforated back-up plate 52 is secured, by clamp band 51 or by welding, at the bottom of upper chamber 50. As shown more clearly in FIG. 2, perforated plate 52 has a series of circular openings 61 located therein. This serves to help support screen 42, preventing it from bowing upwardly. This back-up plate is optional and is used when the screen material may lack sufficient strength to support the pressure differential across the screen. Rod 41 extends through a central opening in screen 42 and the perforated plate 52. A series of two nuts 53 and 54 are screwed onto the top of threaded upper portion of rod 41 to help prevent an upward bowing of perforated plate 52 and screen 42. An outlet opening 60 is located in the side of upper chamber 50 and provides passage for the screened effluent.

In operation, a source of activated sludge to be dewatered enters through inlet line 65 and passes through gate valve 66. The pressure in the line 65 is essentially equal to the pressure in lower chamber 14 at the flow rates normally used. This pressure is measured by pressure gage 67 which is located downstream of gate valve 66. The flexible rubber inlet hose 29 is secured to the inlet line 65 at a point downstream of pressure gage 67.

The sludge to be separated thus enters lower chamber 14 which is maintained completely full of liquid. Outlet hose 37 is connected to an outlet line 70, and an outlet valve 71 is located in outlet line 70 to permit draining the equipment. A constant pressure head is maintained in lower chamber 14 by the location of the opening 72 in outlet line 70. An outlet valve 74 may be placed in outlet line 70 to create a higher back pressure in line 70 and thus in chamber 14. Other means for creating a back pressure may be used in place of valve 74 such as the further elevation of opening 72. Opening 72 is located above concentrate trough 73 which conveys the concentrate to further processing equipment not shown.

As the screen functions to separate the floc particles from the sludge stream, these particles tend to fall downwardly in lower chamber 14 and are conveyed out of chamber 14 through outlet line 70. The relatively solids-free stream passes through outlet 60 and may be directed either to further processing or, if treatment is complete, may be returned to the ground water.

In order to demonstrate the operating characteristics of a separator made according to the present invention, a series of laboratory experiments were performed on a separator having a screen with an 18-inch diameter. The separator had a ¼ horsepower motor with an upper eccentric weight of 3 pounds 1 ounce and a lower eccentric weight of 2 pounds 7 ounces adjusted to a lead angle of 0°. A screen made from 300 mesh nylon was placed above the lower chamber. A perforated plate having a series of closely spaced inch diameter holes was clamped above the nylon screen.

Waste activated sludge obtained from a small treatment plant was utilized. The initial solids-concentration in the waste sludge varied from 0.8 to 1.04 percent suspended solids which is equivalent to 8,000 to 10,400 milligrams per liter. Runs were made at different inlet pressures and the inlet pressure is recorded in Table I below as hydraulic head. No conditioning chemical was used during Runs 1 through 4 and various levels of a cationic, polymeric flocculent having a molecular weight greater than 1 million and sold under the tradename of "Primafloc C7" were used during Runs 5 through 10. The results are shown in Table I below.

TABLE IA

| Run No. | Hydraulic Head, inc. | Average Flow Rate, gal/min/ft$^2$ | Total Volume Screened, gal. | Influent treatment mg/l/C-7 |
|---|---|---|---|---|
| 1 | 12 | 0.25 | 4.0 | none |
| 2 | 18 | 0.40 | 4.7 | none |
| 3 | 24 | 0.73 | 5.4 | none |
| 4 | 36 | 0.96 | 4.9 | none |
| 5 | 18 | 0.38 | 4.3 | 2 |
| 6 | 18 | 0.41 | 4.5 | 10 |
| 7 | 18 | 0.43 | 4.1 | 50 |
| 8 | 36 | 1.05 | 6.4 | 2 |
| 9 | 36 | 1.02 | 6.8 | 10 |
| 10 | 36 | 1.10 | 7.5 | 50 |

TABLE IB

| Run No. | Influent Solids mg/l | Filtrate Solids mg/l | Concentrate Solids mg/l | Percent Solids Removed From Filtrate |
|---|---|---|---|---|
| 1 | 8,200 | 400 | 47,000 | 95.1 |
| 2 | 8,200 | 460 | 46,000 | 94.4 |
| 3 | 9,400 | 540 | 54,000 | 94.3 |
| 4 | 9,400 | 530 | 53,000 | 94.4 |
| 5 | 10,400 | 325 | 51,000 | 96.9 |
| 6 | 10,400 | 390 | 52,000 | 96.3 |
| 7 | 10,400 | 300 | 52,500 | 97.1 |
| 8 | 9,700 | 420 | 64,000 | 95.7 |
| 9 | 9,700 | 380 | 71,000 | 96.1 |
| 10 | 9,700 | 385 | 80,000 | 96.0 |

It was noted that the initial solids-concentration in the filtrate was about twice as high as the final solid concentration in the filtrate. This was believed to be due to the effect of a build-up of some floc particles on the underside of the screen which acted as a filter aid and further reduced the solids-concentration in the filtrate. The flow rate through the screen tended to decrease with time as the gelatinous mass built up on the undersurface of the screen.

The effect of chemical conditioning by the use of the polymeric flocculent sold under the tradename "Primafloc C7" is shown by a comparison of Run 2 with Runs 5 through 7. Chemical conditioning appeared to result in a decrease in the level of solids in the filtrate even though the influent solids were at a slightly higher level. Thus, the present system may be readily used with chemical conditioning treatment although the process can produce high solids removal with no chemical conditioning at all. Note that greater than 94 percent of the solids were removed in Runs 1 through 4 where no chemical conditioning was used.

Of course, while the separator has been discussed in terms of a waste-water treating device it is to be understood that the process is also useful for other liquid-solid separations, particularly those involving difficult to separate solids. While certain embodiments of the invention have been described, the invention may be embodied in other specific forms not departing from the spirit or central characteristics thereof. The present embodiments and examples are therefore to be considered in all respects as illustrative and not restrictive.

What is claimed is:

1. A vibratory separator for dividing a solids-containing liquid into a concentrate stream and a relatively solids-free stream, said separator comprising:

a base, resilient means connecting said base to a lower chamber, vibratory means coupled with said lower chamber, means for feeding a stream of solids-containing liquid into the interior of said lower chamber, screen means connected to an upper portion of said lower chamber, means for removing a relatively solids-free stream from the upper surface of said screen means, and means for removing a concentrate stream from said lower chamber.

2. The separator of claim 1 wherein said resilient means comprise a plurality of coil springs attached at their lower ends to said base and at their upper ends to said lower chamber.

3. The separator of claim 1 wherein said vibratory means comprises a motor having at least one eccentric rotating weight attached to the shaft thereof.

4. The separator of claim 1 further including a perforated plate affixed above and adjacent to said screen means.

5. The separator of claim 1 further including back pressure means in said means for removing said concentrate whereby the pressure in said lower chamber can be varied.

6. The separator of claim 1 further including pressure indicating means operably connected to said lower chamber for indicating the pressure in said lower chamber.

7. A vibratory separator for dividing a solids-containing liquid into a concentrate stream and a relatively solids-free stream, said separator comprising:

a lower generally cylindrical chamber having a closed bottom and an open top, circular screen means held across said open top, means for vibrating said lower chamber and said screen means, means for feeding a stream of solids-containing liquid to said lower chamber, said means for feeding providing sufficient pressure so that said stream of solids-containing liquid substantially fills said lower chamber, means for removing a relatively solids-free liquid from above said screen, and means for removing a concentrate stream from said lower chamber.

8. A method for dividing a solids-containing liquid into a concentrate stream and a relatively solids-free stream comprising:

vibrating a lower chamber having a closed bottom and an upper area containing a porous member having pores of a size sufficiently small so that a substantial number of the solids in said solids-containing liquid cannot pass therethrough, feeding said solids-containing liquid into said chamber under a pressure sufficient to substantially fill said chamber and to force a portion of said liquid upwardly through said porous member, removing the resulting relatively solids-free stream which has passed through said porous member, and removing the resulting concentrate stream from said lower chamber.

9. The method of claim 8 wherein said porous member is a generally horizontal screen.

* * * * *